United States Patent
Zhao

(10) Patent No.: US 10,941,277 B2
(45) Date of Patent: Mar. 9, 2021

(54) NUCLEATING AGENT COMPOSITION COMPRISING TRACE AMOUNT OF AROMATIC ALDEHYDE, SORBITOL DIACETAL AND SORBITOL TRIACETAL

(71) Applicant: GCH Technology Co., Ltd., Guangzhou (CN)

(72) Inventor: Wenlin Zhao, Guangzhou (CN)

(73) Assignee: GCH Technology Co., Ltd., Guangzhou (CN)

( * ) Notice: Subject to any disclaimer, the term of this patent is extended or adjusted under 35 U.S.C. 154(b) by 59 days.

(21) Appl. No.: 16/324,906

(22) PCT Filed: Jul. 21, 2017

(86) PCT No.: PCT/CN2017/093799
§ 371 (c)(1),
(2) Date: Feb. 12, 2019

(87) PCT Pub. No.: WO2018/040784
PCT Pub. Date: Mar. 8, 2018

(65) Prior Publication Data
US 2020/0131333 A1 Apr. 30, 2020

(30) Foreign Application Priority Data
Sep. 5, 2016 (CN) .......................... 201610802816.5

(51) Int. Cl.
*C08K 5/1575* (2006.01)
*C08F 10/02* (2006.01)
*C08F 10/06* (2006.01)
*C08K 5/07* (2006.01)

(52) U.S. Cl.
CPC ............ *C08K 5/1575* (2013.01); *C08F 10/02* (2013.01); *C08F 10/06* (2013.01); *C08K 5/07* (2013.01); *C08K 2201/014* (2013.01)

(58) Field of Classification Search
CPC .. C08K 5/1575; C08K 5/07; C08K 2201/014; C08F 10/06
USPC ........................................................ 524/108
See application file for complete search history.

(56) References Cited

U.S. PATENT DOCUMENTS

| | | | |
|---|---|---|---|
| 4,954,291 A | 9/1990 | Kobayashi | |
| 5,216,051 A | 6/1993 | Smith | |
| 6,245,813 B1 | 6/2001 | Zhou | |
| 6,245,843 B1 | 6/2001 | Kobayashi | |
| 7,662,978 B2 * | 2/2010 | Xie ...................... | C07D 493/04 |
| | | | 524/108 |
| 10,208,057 B2 | 2/2019 | Zhao | |

FOREIGN PATENT DOCUMENTS

| | | |
|---|---|---|
| CN | 1241190 A | 1/2000 |
| CN | 1563012 A | 1/2005 |
| CN | 101434606 A | 5/2009 |
| CN | 101434607 A | 5/2009 |
| CN | 101613490 A | 12/2009 |
| CN | 101987891 | 3/2011 |
| CN | 102675331 A | 9/2012 |
| CN | 105623105 A | 6/2016 |
| CN | 105802006 A | 7/2016 |

OTHER PUBLICATIONS

International Search Report of PCT/CN2017/093799, dated Sep. 30, 2017. Submitted for the Examiner's convience. Not self-admitted prior art.
Machine translation of the Abstract of CN 105802006A, Jul. 27, 2016.
Machine translation of the Specification of CN 105802006A, Jul. 27, 2016.
Machine translation of the Abstract of CN 101434607A, May 20, 2009.
Machine translation of the Specification of CN 101434607A, May 20, 2009.
Machine translation of the Abstract of CN 101613490A, Dec. 30, 2009.
Machine translation of the Specification of CN 101613490A, Dec. 30, 2009.
Machine translation of the Abstract of CN 1563012A, Jan. 12, 2005.
Machine translation of the Abstract of CN 101434606A, May 20, 2009.
Machine translation of the Specification of CN 101434606A, May 20, 2009.
Machine translation of the Abstract of CN 102675331A, Sep. 19, 2012.
Machine translation of the Specification of CN 102675331A, Sep. 19, 2012.
Machine translation of the Abstract of CN 101987891A, Mar. 23, 2011.
Machine translation of the Abstract of CN 1241190A, Jan. 12, 2000.
Machine translation of the Specification of CN 1241190A, Jan. 12, 2000.
Machine translation of the Specification of CN 101987891A, Mar. 23, 2011.
Machine translation of the Abstract of CN 105623105A, Jun. 1, 2016.
Machine translation of the Specification of CN 105623105A, Jun. 1, 2016.

* cited by examiner

*Primary Examiner* — Hui H Chin

(57) ABSTRACT

The present application provides a nucleator composition including trace amount of an aromatic aldehyde, a sorbitol diacetal and a sorbitol triacetal. The nucleator composition of the present application can improve nucleation performance of a polymer, increase transparency, glossiness, flexural modulus and tensile strength of polymer films, polymer sheets and polymer moulding articles, and can improve heat distortion temperature and dimensional stability of polymer articles. In addition, a polymer contains the nucleator composition of the present application will not give off unpleasant odour.

12 Claims, No Drawings

NUCLEATING AGENT COMPOSITION COMPRISING TRACE AMOUNT OF AROMATIC ALDEHYDE, SORBITOL DIACETAL AND SORBITOL TRIACETAL

CROSS REFERENCE TO RELATED APPLICATIONS

The present application is a U.S. national phase of international application, No. PCT/CN2017/093799, filed on Jul. 21, 2017, which claims priority to Chinese patent application, No. CN201610802816.5, filed on Sep. 5, 2016, the disclosures of both patent applications are hereby incorporated by reference.

FIELD OF THE INVENTION

The present invention generally relates to nucleators for use in polymers and, more particularly, relates to a nucleator composition having trace amount of an aromatic aldehyde, a sorbitol diacetal and a sorbitol triacetal, method for preparing the same and use thereof.

BACKGROUND OF THE INVENTION

At present, sorbitol diacetal is generally used as a basic ingredient of a sorbitol nucleator used industrially. And sorbitol triacetal is needed to be removed from the sorbitol nucleator as impurities. Alternatively, the reaction condition of a preparation process is needed to be controlled, so as to avoid generating sorbitol triacetal. For instance, Chinese patent application number CN 200410026622.8 discloses a method for purifying nucleators, in which methylene benzylidene sorbitol and trimethylene benzylidene sorbitol are removed to improve the purity of the nucleator. However, in CN 200410026622.8, the purity of the purified nucleator cannot reach 100% yet, and the impurities and concentrations thereof in the nucleator cannot be determined.

Other sorbitol nucleators may contain too much triacetal or contain no triacetal. For instance, Chinese patent application CN 200810219978.1 discloses a method for preparing nucleators. During the preparation of the nucleator, the amount of aromatic aldehyde added, the reaction time and reaction temperature are controlled. Because no special attention has been paid to feeding sequence and feed amount, triacetal and diacetal in the products cannot be controlled precisely. Content of the product and concentrations thereof in the nucleator cannot be determined precisely. In addition, effects of nucleator containing particular amount of triacetal on the performances of the products have not been studied yet.

One object of the present invention is to provide a nucleator composition which contains particular amount of sorbitol triacetal. The nucleator composition of the present invention plays a special role during the nucleation process of the polymers. Moreover, roles of nucleators containing different amounts of sorbitol triacetals in the nucleation process of different polymers have also been studied. According to one aspect of the present invention, polymers contain nucleator composition of the present invention will not give off unpleasant odour.

DESCRIPTION OF THE INVENTION

According to one embodiment of the present invention, a nucleator composition is provided. The nucleator composition includes a compound represented by formula (I):

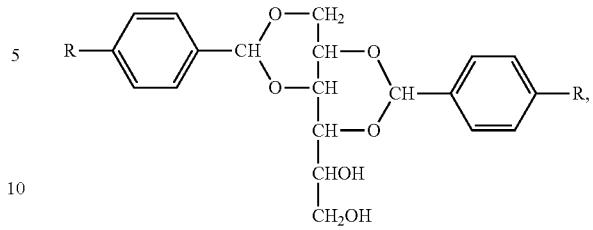

a compound represented by formula (II):

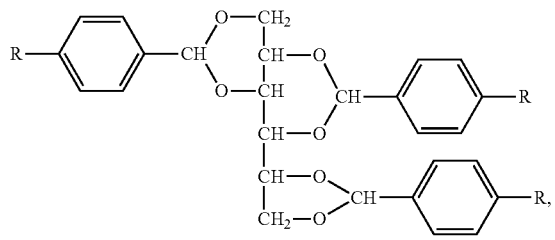

a compound represented by formula (III):

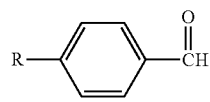

wherein each R is —Cl, —Br, —$CH_3$ or —$CH_2$—$CH_3$ independently, a weight ratio of the compound represented by formula (I) to the compound represented by formula (II) is 95.0-98.0:2.0-5.0, and a weight content of the compound represented by formula (III) in the nucleator composition is 0.0001-0.015 wt %.

The term "nucleator" used herein, refers to a nucleating agent, which is used for the nucleation of a polymer.

Preferably, a weight content of the compound represented by formula (II) in the nucleator composition is 2.0-5.0 wt %.

Preferably, a weight content of the compound represented by formula (III) in the nucleator composition is 0.001-0.010 wt %.

Preferably, R is —Cl.

Preferably, R is —$CH_3$.

In the present invention, term CDBS refers to 1,3,2,4-Di-p-Chlorobenzylidene sorbitol, CTBS refers to 1,3,2,4,5,6-Tri-p-Chlorobenzylidene sorbitol, MDBS refers to 1,3,2,4-di-p-methylbenyliedene, MTBS refers to 1,3,2,4,5,6-tri-p-methylbenyliedene. In addition, the compound represented by formula (II) used herein may be referred as sorbitol triacetal, and the compound represented by formula (I) used herein may be referred as sorbitol diacetal.

The term PP used herein refers to polypropylene, and PE refers to polyethylene.

According to another embodiment of the present invention, provided is a method for preparing a nucleator composition, including the steps of:
1) adding cyclohexane in a reactor and stirring;
2) adding all sorbitol needed into the reactor;

3) adding ⅓ by weight of aromatic aldehyde needed in the reactor;

4) adding a composite catalyst in the reactor, and heating for 0.4-1 hour for cyclohexane refluxing to carry out dehydration condensation reaction;

5) then adding a mixture of cyclohexane and ⅓ by weight of aromatic aldehyde needed, and keeping heating for 0.4-1 hour;

6) then adding a mixture of cyclohexane and ⅓ by weight of aromatic aldehyde needed, keeping heating for 1-3 hours, and recycling cyclohexane until the mole ratio of water collected to sorbitol in the oil-water separator is 1.5-2.0:1;

7) lowering temperature, reducing pressure and recovering cyclohexane and water via distillation, and then obtaining a crude product;

8) dispersing the crude product in water, adding sodium hydroxide and hydrogen peroxide, and stirring; and 9) after washing, filter pressing, drying and smashing, obtaining a white powder of the nucleator composition.

Preferably, the aromatic aldehyde in the present invention is chlorobenzaldehyde, bromobenzaldehyde, methylbenzaldehyde or p-ethyl benzaldehyde.

According to one aspect of the present invention, the composite catalyst includes a mixture of toluene-p-sulfonic acid and glycol ether. Preferably, the alcohol ether is ethylene glycol monomethyl ether, ethylene glycol dimethyl ether, ethylene glycol diethyl ether, ethylene glycol monobutyl ether or ethylene glycol di-butyl ether. Preferably, the mole ratio of toluene-p-sulfonic acid to alcohol ether is 3-5:8-10.

In a preferable method of the present invention, the volume ratio of cyclohexane in step 4) and/or step 5) to cyclohexane in step 1) is 1:3.

According to one aspect of the present application, the present application provides use of a compound represented by formula (II) in reducing or eliminating odour of a polymer containing a nucleator composition,

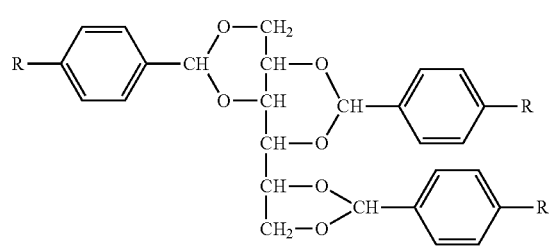

wherein the nucleator composition includes compounds represented by formula (I), formula (II) and formula (III)

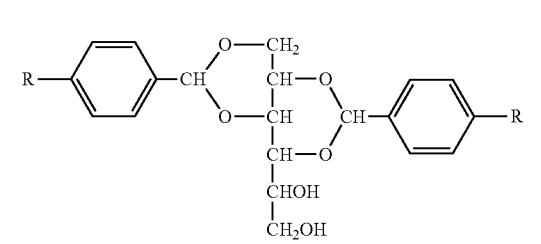

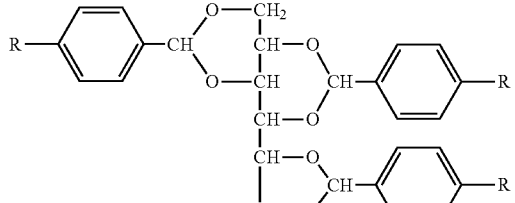

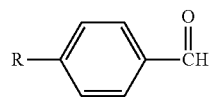

wherein each R is —Cl, —Br, —CH₃ or —CH₂—CH₃ independently, a weight ratio of the compound represented by formula (I) to the compound represented by formula (II) is 95.0-98.0:2.0-5.0, and a weight content of the compound represented by formula (III) in the nucleator composition is 0.0001-0.015 wt %.

Preferably, a weight content of the compound represented by formula (II) in the nucleator composition is 2.0-5.0 wt %.

Preferably, a weight content of the compound represented by formula (III) in the nucleator composition is 0.001-0.010 wt %.

According to one aspect of the present invention, the nucleator composition according to the present invention is used in improving performances of a polymer, including: increasing transparency, glossiness, flexural modulus and tensile strength of polymer films, polymer sheets and polymer moulding articles; improving heat distortion temperature and dimensional stability of polymer articles; shortening molding cycle, increasing productivity, improving smell of the polymer so that the polymer does not give off unpleasant odour, wherein the polymer is polyethylene or polypropylene. Preferably, the nucleator composition of the present invention is used in increasing transparency of polymers and improving smell of the polymers so that the polymers do not give off unpleasant odour.

According to one aspect of the present invention, the nucleator composition according to the present invention is used in increasing transparency of polyethylene and improving smell of the polyethylene so as to do not give off unpleasant odour, wherein the polymer is polyethylene, a weight ratio of the compound represented by formula (I) to the compound represented by formula (II) is 95.0-98.0:2.0-5.0, and a weight content of the compound represented by formula (III) in the nucleator composition is 0.0001-0.015 wt %.

Preferably, a weight content of the compound represented by formula (II) in the nucleator composition is 2.0-5.0 wt %.

According to one aspect of the present invention, a polymer including the nucleator composition of the present invention is provided, and the weight content of the nucleator composition in the polymer is 0.1-0.3 wt %.

Preferably, the polyethylene is one of low density polyethylene, medium density polyethylene, high density polyethylene, linear low density polyethylene, ultrahigh molecular weight polyethylene, and ethylene copolymer.

Preferably the ethylene copolymer is one of ethylene-propylene copolymer, EVA, ethylene -butene copolymer, ethylene -octene copolymer, and ethylene unsaturated ester copolymer.

Preferably, the polypropylene is one of isotactic polypropylene, random polypropylene, syndiotactic polypropylene, chlorinated polypropylene, and grafted polypropylene.

The present invention also provides a plastic article having high light transmittance, wherein the plastic article is made from the polymer of the present invention.

The nucleator composition of the present invention can improve performances of PE and PP, especially in reducing processing temperature of PE and PP as well as having unexpected effect on performances of the PE and PP, such as increasing transparency, glossiness, flexural modulus and tensile strength of polymer films, polymer sheets and polymer moulding articles, improving heat distortion temperature and dimensional stability of polymer articles, shortening molding cycle, and increasing productivity. The polymer includes PE and PP. The nucleator composition of the present invention contains sorbitol triacetal, which can ensure the content of aromatic aldehydes less than 150 ppm and the polymer containing the nucleator composition will not give off unpleasant odour. Instead, without sorbitol triacetal, the nucleator composition containing 150 ppm aromatic aldehydes will lead to unpleasant odour of polymer.

EXAMPLES

The composite catalysts used in the examples of the present invention mainly includes:

Composite catalyst 1 which comprises P-toluenesulfonic acid and ethylene glycol monomethyl ether, and the mole ratio of the P-toluenesulfonic acid to the ethylene glycol monomethyl ether is 3:10;

Composite catalyst 2 which comprises P-toluenesulfonic acid and ethylene glycol dimethyl ether, and the mole ratio of the P-toluenesulfonic acid to the ethylene glycol dimethyl ether is 3:10;

Composite catalyst 3 which comprises P-toluenesulfonic acid and ethylene glycol diethyl ether, and the mole ratio of the P-toluenesulfonic acid to the ethylene glycol diethyl ether is 3:9;

Composite catalyst 4 which comprises P-toluenesulfonic acid and ethylene glycol monobutyl ether, and the mole ratio of the P-toluenesulfonic acid to the ethylene glycol monobutyl ether is 3:9;

Composite catalyst 5 which comprises P-toluenesulfonic acid and glycol dibutyl ether, and the mole ratio of the P-toluenesulfonic acid to the glycol dibutyl ether is 3:8.

Example 1 Nucleator Composition 1:
CDBS:CTBS=99.99: 0.01, Aldehyde: 20 ppm

The example was carried out by the process including the steps of:

adding 85 kg solid sorbitol and 45 kg chlorobenzaldehyde into a 2000 L reactor, adding about 600 L cyclohexane into the reactor, and stirring the mixture in the reactor for 30 minutes;

adding 10 kg composite catalyst 1 into the reactor and keeping stirring, while heating the mixture for about half an hour for the solvent cyclohexane refluxing;

adding a mixed solution containing 45 kg chlorobenzaldehyde and 200 L cyclohexane, and keeping stirring and heating for half an hour;

adding a mixed solution containing 45 kg chlorobenzaldehyde and 200 L cyclohexane, and keeping stirring and heating for 2.3 hours, recovering cyclohexane at the time when the volume of water generated in the condensation reaction and collected in the oil-water separator of the reactor reaches 14 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 190.5 kg CDBS, 0.0191 kg CTBS (the weight ratio of CDBS to CTBS is 99.99:0.01), and the weight content of chlorobenzaldehyde in the white powder is 0.002%.

Example 2 Nucleator Composition 2:
CDBS:CTBS=99.9: 0.1, Aldehyde: 50 ppm

The example was carried out by the process including the steps of:

adding 85 kg solid sorbitol and 45 kg chlorobenzaldehyde into a 2000 L reactor, adding about 600 L cyclohexane into the reactor, and stirring the mixture in the reactor for 30 minutes;

adding 10 kg composite catalyst 2 into the reactor and keeping stirring, while heating the mixture for about half an hour for the solvent cyclohexane refluxing;

adding a mixed solution containing 45 kg chlorobenzaldehyde and 200 L cyclohexane, and keeping stirring and heating for half an hour;

adding a mixed solution containing 45 kg chlorobenzaldehyde and 200 L cyclohexane, and keeping stirring and heating for 2.4 hours, recovering cyclohexane at the time when the volume of water generated in the condensation reaction and collected in the oil-water separator of the reactor reaches 15.5 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 192.1 kg CDBS, 0.192 kg CTBS (the weight ratio of CDBS to CTBS is 99.9:0.1), and the weight content of chlorobenzaldehyde in the white powder is 0.005%.

Example 3 Nucleator Composition 3:
CDBS:CTBS=98:2, Aldehyde: 100 ppm

The example was carried out by the process including the steps of:

adding 85 kg solid sorbitol and 45.6 kg chlorobenzaldehyde into a 2000 L reactor, adding about 600 L cyclohexane into the reactor, and stirring the mixture in the reactor for 30 minutes;

adding 11 kg composite catalyst 3 into the reactor and keeping stirring, while heating the mixture for about half an hour for the solvent cyclohexane refluxing;

adding a mixed solution containing 45.6 kg chlorobenzaldehyde and 200 L cyclohexane, and keeping stirring and heating for half an hour;

adding a mixed solution containing 45.6 kg chlorobenzaldehyde and 200 L cyclohexane, and keeping stirring and heating for 2.5 hours, recovering cyclohexane at the time when the volume of water generated in the condensation reaction and collected in the oil-water separator of the reactor reaches 16 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 191.5 kg CDBS, 3.83 kg CTBS (the weight ratio of CDBS to CTBS is 98.0:2.0), and the weight content of chlorobenzaldehyde in the white powder is 0.01%.

Example 4 Nucleator Composition 3:
CDBS:CTBS=98:3, Aldehyde: 120 ppm

The example was carried out by the process including the steps of:

adding 85 kg solid sorbitol and 45.9 kg chlorobenzaldehyde into a 2000 L reactor, adding about 600 L cyclohexane into the reactor, and stirring the mixture in the reactor for 30 minutes;

adding 11 kg composite catalyst 4 into the reactor and keeping stirring, while heating the mixture for about half an hour for the solvent cyclohexane refluxing;

adding a mixed solution containing 45.9 kg chlorobenzaldehyde and 200 L cyclohexane, and keeping stirring and heating for half an hour;

adding a mixed solution containing 45.9 kg chlorobenzaldehyde and 200 L cyclohexane, and keeping stirring and heating for 2.6 hours, recovering cyclohexane at the time when the volume of water generated in the condensation reaction and collected in the oil-water separator of the reactor reaches 16.5 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 193.387 kg CDBS, 5.801 kg CTBS (the weight ratio of CDBS to CTBS is 98.0:3.0), and the weight content of chlorobenzaldehyde in the white powder is 0.012%.

Example 5 Nucleator Composition 4:
CDBS:CTBS=95: 5, Aldehyde: 150 ppm

The example was carried out by the process including the steps of:

adding 85 kg solid sorbitol and 138 kg chlorobenzaldehyde into a 2000 L reactor, adding about 600 L cyclohexane into the reactor, and stirring the mixture in the reactor for 30 minutes;

adding 13 kg composite catalyst 5 into the reactor and keeping stirring, while heating the mixture for about half an hour for the solvent cyclohexane refluxing;

adding a mixed solution containing 46 kg chlorobenzaldehyde and 200 L cyclohexane, and keeping stirring and heating for half an hour;

adding a mixed solution containing 46 kg chlorobenzaldehyde and 200 L cyclohexane, and keeping stirring and heating for 2.8 hours, recovering cyclohexane at the time when the volume of water generated in the condensation reaction and collected in the oil-water separator of the reactor reaches 17 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 193.8 kg CDBS, 9.7 kg CTBS (the weight ratio of CDBS to CTBS is 95.0:5.0), and the weight content of chlorobenzaldehyde in the white powder is 0.015%.

Example 6 Nucleator Composition 5:
MDBS:MTBS=99.99: 0.01, Aldehyde: 20 ppm

The example was carried out by the process including the steps of:

adding 85 kg solid sorbitol and 38.6 kg methylbenzaldehyde into a 2000 L reactor, adding about 600 L cyclohexane into the reactor, and stirring the mixture in the reactor for 30 minutes;

adding 10 kg composite catalyst 1 into the reactor and keeping stirring, while heating the mixture for about half an hour for the solvent cyclohexane refluxing;

adding a mixed solution containing 38.6 kg methylbenzaldehyde and 200 L cyclohexane, and keeping stirring and heating for half an hour;

adding a mixed solution containing 38.6 kg methylbenzaldehyde and 200 L cyclohexane, and keeping stirring and heating for 2.4 hours, recovering cyclohexane at the time when the volume of water generated in the condensation reaction and collected in the oil-water separator of the reactor reaches 15 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 173.2 kg MDBS, 0.0173 kg MTBS (the weight ratio of MDBS to MTBS is 99.99:0.01), and the weight content of methylbenzaldehyde in the white powder is 0.002%.

Example 7 Nucleator Composition 6:
MDBS:MTBS=99.5: 0.5, Aldehyde: 50 ppm

The example was carried out by the process including the steps of:

adding 85 kg solid sorbitol and 38.7 kg methylbenzaldehyde into a 2000 L reactor, adding about 600 L cyclohexane into the reactor, and stirring the mixture in the reactor for 30 minutes;

adding 10 kg composite catalyst 1 into the reactor and keeping stirring, while heating the mixture for about half an hour for the solvent cyclohexane refluxing;

adding a mixed solution containing 38.7 kg methylbenzaldehyde and 200 L cyclohexane, and keeping stirring and heating for half an hour;

adding a mixed solution containing 38.7 kg methylbenzaldehyde and 200 L cyclohexane, and keeping stirring and heating for 2.45 hours, recovering cyclohexane at the time when the volume of water generated in the condensation reaction and collected in the oil-water separator of the reactor reaches 15 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 174.0 kg MDBS, 0.87 kg MTBS (the weight ratio of MDBS to MTBS is 99.5:0.5), and the weight content of methylbenzaldehyde in the white powder is 0.005%.

Example 8 Nucleator Composition 7:
MDBS:MTBS=98:2, Aldehyde: 100 ppm

The example was carried out by the process including the steps of:

adding 85 kg solid sorbitol and 39.3 kg methylbenzaldehyde into a 2000 L reactor, adding about 600 L cyclohexane into the reactor, and stirring the mixture in the reactor for 30 minutes;

adding 11 kg composite catalyst 3 into the reactor and keeping stirring, while heating the mixture for about half an hour for the solvent cyclohexane refluxing;

adding a mixed solution containing 39.3 kg methylbenzaldehyde and 200 L cyclohexane, and keeping stirring and heating for half an hour;

adding a mixed solution containing 39.3 kg methylbenzaldehyde and 200 L cyclohexane, and keeping stirring and heating for 2.5 hours, recovering cyclohexane at the time when the volume of water generated in the condensation reaction and collected in the oil-water separator of the reactor reaches 16 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 174.939 kg MDBS, 3.499 kg MTBS (the weight ratio of MDBS to MTBS is 98:2), and the weight content of methylbenzaldehyde in the white powder is 0.01%.

Example 9 Nucleator Composition 7:
MDBS:MTBS=98:3, Aldehyde: 120 ppm

The example was carried out by the process including the steps of:

adding 85 kg solid sorbitol and 39.7 kg methylbenzaldehyde into a 2000 L reactor, adding about 600 L cyclohexane into the reactor, and stirring the mixture in the reactor for 30 minutes;

adding 11 kg composite catalyst 4 into the reactor and keeping stirring, while heating the mixture for about half an hour for the solvent cyclohexane refluxing;

adding a mixed solution containing 39.7 kg methylbenzaldehyde and 200 L cyclohexane, and keeping stirring and heating for half an hour;

adding a mixed solution containing 39.7 kg methylbenzaldehyde and 200 L cyclohexane, and keeping stirring and heating for 2.7 hours, recovering cyclohexane at the time when the volume of water generated in the condensation reaction and collected in the oil-water separator of the reactor reaches 16 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 173.153 kg MDBS, 5.194 kg MTBS (the weight ratio of MDBS to MTBS is 97:3), and the weight content of methylbenzaldehyde in the white powder is 0.012%.

Example 10 Nucleator Composition 8:
MDBS:MTBS=95:5, Aldehyde: 150 ppm

The example was carried out by the process including the steps of:

adding 85 kg solid sorbitol and 40 kg methylbenzaldehyde into a 2000 L reactor, adding about 600 L cyclohexane into the reactor, and stirring the mixture in the reactor for 30 minutes;

adding 12 kg composite catalyst 5 into the reactor and keeping stirring, while heating the mixture for about half an hour for the solvent cyclohexane refluxing;

adding a mixed solution containing 40 kg methylbenzaldehyde and 200 L cyclohexane, and keeping stirring and heating for half an hour;

adding a mixed solution containing 40 kg methylbenzaldehyde and 200 L cyclohexane, and keeping stirring and heating for 2.9 hours, recovering cyclohexane at the time when the volume of water generated in the condensation reaction and collected in the oil-water separator of the reactor reaches 17 L;

cooling and reducing the pressure to recover the unreacted cyclohexane and water, and obtaining the crude product;

dispersing the crude product into water, adding 3 kg sodium hydroxide and stirring, and then adding 20 kg hydrogen peroxide with a concentration of about 30 wt % and stirring; and after filter pressing, washing and drying, obtaining a white powder.

By gas chromatography-mass spectrometry, the white powder contains 169.583 kg MDBS, 8.479 kg MTBS (the weight ratio of MDBS to MTBS is 95:5), and the weight content of methylbenzaldehyde in the white powder is 0.015%.

Comparative Example 1: Preparation of Comparative CDBS

Chemical synthesis was carried out in a 600 L reactor equipped with a thermometer, a stirring paddle, an electric heating system for heating organic carrier, an oil-water separator and a reflux condenser by the process including the steps of:

adding 115 kg chlorobenzaldehyde and 70 kg solid sorbitol into the reactor, adding 600 L solvent cyclohexane, and fastening the hand hole cover;

starting the stirring paddle, starting the electric heating system to maintain the temperature of the oil at 55° C. for about 30 minutes, so that chlorobenzaldehyde was fully dissolved in and mixed with the sorbitol;

slowly adding a composite catalyst containing 3.5 kg benzenesulfonic acid and 3.6 kg glycol ether in about 10 minutes and starting the chiller system; and resetting the oil temperature of the electric furnace at a constant temperature of 100-120° C., so that the cyclohexane continuously cycles and refluxes in the reflux condenser, and keeping the minimum azeotrope of cyclohexane and water generated by the aldol reaction flow through the reflux condenser for continuously removing water to carry out the reaction smoothly.

When the water removed reached a predetermined value, the reaction was completed and a crude product was obtained. The crude product then was transferred to a stainless steel barrel. Water was added in the stainless steel barrel.

After dispersed in a dispersion machine and then treated with a colloid mill, the crude product was further leached and dehydrated in a centrifuge. The dehydrated crude product was transferred to a stainless steel barrel and 4 kg NaOH was added into the stainless steel barrel. After stirring rapidly until the mixture was turned into a slurry, 35 kg $H_2O_2$ (concentration of $H_2O_2$ is about 30%) was added. Then the process including stirring for 4 hours, washing and centrifugal dewatering was repeated two times. After drying and smashing, comparative product 1 was obtained.

By gas chromatography-mass spectrometry, the white powder of comparative product 1 does not contain CTBS, and the weight content of methylbenzaldehyde in the white powder is 0.010%.

Comparative Example 2: Preparation of Comparative MDBS

Chemical synthesis was carried out in a 600 L reactor equipped with a thermometer, a stirring paddle, an electric heating system for heating organic carrier, an oil-water separator and a reflux condenser by the process comprising the steps of:

adding 120 kg methylbenzaldehyde and 85 kg solid sorbitol into the reactor, adding 600 L solvent cyclohexane, and fastening the hand hole cover;

starting the stirring paddle, starting the electric heating system to maintain the temperature of the oil at 55° C. for about 30 minutes, so that methylbenzaldehyde was fully dissolved in and mixed with the sorbitol;

slowly adding a composite catalyst containing 3.5 kg benzenesulfonic acid and 3.6 kg glycol ether in about 10 minutes and starting the chiller system; and resetting the oil temperature of the electric furnace at a constant temperature of 100-120° C., so that the cyclohexane continuously cycles and refluxes in the reflux condenser, and keeping the minimum azeotrope of cyclohexane and water generated by the aldol reaction flow through the reflux condenser for continuously removing water to carry out the reaction smoothly.

When the water removed reached a predetermined value, the reaction was completed and a crude product was obtained. The crude product then was transferred to a stainless steel barrel. Water was added in the stainless steel barrel.

After dispersed in a dispersion machine and then treated with a colloid mill, the crude product was further leached and dehydrated in a centrifuge. The dehydrated crude product was transferred to a stainless steel barrel and 4 kg NaOH was added into the stainless steel barrel. After stirring rapidly until the mixture was turned into a slurry, 35 kg $H_2O_2$ (concentration of $H_2O_2$ is about 30%) was added. Then the process including stirring for 4 hours, washing and centrifugal dewatering was repeated two times. After drying and smashing, comparative product 2 was obtained.

By gas chromatography-mass spectrometry, the white powder of comparative product 2 does not contain MTBS, and the weight content of methylbenzaldehyde in the white powder is 0.010%.

The method for measuring Examples 1-10 and Comparative Examples 1-2 products via gas chromatography—mass spectrometry includes the steps of:

weighting approximately 0.5000 g Example product in a 10.0 ml flask;

dissolving the Example product in dimethyl sulfoxide solvent under ultrasonic; and determining all of the components by GCMS area normalization method, wherein the chromatogram does not compare integral raw material impurities (3,4-dimethyl benzaldehyde).

According to experimental analysis, the sample remaining in the system is large. After injection, triacetal is detected in the first blank. The second blank spectra is clean. Therefore, the residual is removed by a system blank program between each sample.

Each sample was analyzed twice, and the second analysis data is selected for analysis.

The measurement results are automatically calculated by the GCMS solution 4.11 SU1 software.

The gas chromatography conditions are detailed as following. The inlet temperature is 300° C. The inlet time is 0.5 minutes. The oven temperature is 120° C. The pressure is 91.0 kPa. The total flow is 6.0 ml/min. The column flow rate is 3.00 ml/min. The line speed is 65.0 cm/sec. The purge flow rate is 3 ml/min. The temperature program includes maintaining the temperature at 120° C. for 1.00 min, raising the temperature to 300° C. at a heating rate of 15° C./min, and maintaining the temperature at 300° C. for 17.00 min.

The MS conditions are detailed as following. The ion source temperature is 260° C. The interface temperature is 300° C. The scanning speed is 2000 amu/s. The scanning range is m/z80~m/z1000. The solvent delay is 1.50 min. The capture start time is 1.75 min. The capture end time is 30.00 min.

Experiment Example 1

Effects of nucleators of Examples 1-10 on the performances of PP and PE

Nucleator compositions of Examples 1-10 and comparative examples 1-2 are added into PP and PE respectively, so as to assess the effects thereof on the polymers.

1.0 g-2.5 g of each of the nucleator compositions was added to 1000 g PP or PE resin, and the extrusion temperature was 190~210° C. for PP and 170~190° C. for PE. In order to test effects of the nucleator compositions on the PP or PE articles, in all of the examples, the concentration of each of the nucleator compositions in the articles was 0.15~0.25% (relative to the mass of the PP and PE resin), and the extrusion temperature was 200~210° C. for PP and 170~190° C. for PE.

Nucleator compositions according to examples 1-10 and comparative examples 1-2 were respectively added into 1000 g resin and mixed by a high speed mixer for 5 minutes to obtain resin mixture. The resin mixture was squeezed by a twin screws extruder at the extrusion temperature of 180~210° C. to obtain samples respectively.

Similarly, according to the method mentioned above, homo-polymer polypropylene resin composition HP500N having no nucleator and linear low density polyethylene resin composition7042 having no nucleator was prepared and extruded by a twin screw extruder, to obtain comparative samples respectively.

The PP composition was injection molded at 230° C. to obtain samples for light transmittance and haze test and for impact test. The PE composition was extruded to blow a film at 200° C. to obtain samples for light transmittance and haze test. The PE composition was injection molded at 200° C. to obtain samples for impact test. The thickness of PP samples for light transmittance and haze test was 1.0 mm. The thickness of PE samples for light transmittance and haze test was 0.030 mm.

TABLE 1

Effects of nucleator compositions on performances of injection molded samples (weight content of nucleator in the polymer is 0.2 wt %)

| Polymer | Nucleator composition | Light transmittance | Haze % | Odour intensity |
|---|---|---|---|---|
| PE | Example 1 | 90.1 | 4.5 | No odour |
| PE | Example 2 | 90.2 | 4.6 | No odour |
| PE | Example 3 | 90.4 | 4.6 | No odour |
| PE | Example 4 | 91.2 | 3.9 | No odour |
| PE | Example 5 | 91.4 | 3.8 | No odour |
| PE | Example 6 | 89.3 | 4.2 | Slight odour |
| PE | Example 7 | 89.8 | 4.0 | Slight odour |
| PE | Example 8 | 89.9 | 4.3 | No odour |
| PE | Example 9 | 92.3 | 3.9 | No odour |
| PE | Example 10 | 92.1 | 3.7 | No odour |
| PE | Comparative example 1 | 85.2 | 4.6 | Heavy odour |
| PE | Comparative example 2 | 86.7 | 4.8 | Heavy odour |
| PE | Blank nucleator | 84.7 | 13.5 | No odour |
| PP | Example 1 | 89.2 | 15.4 | Slight odour |
| PP | Example 2 | 89.8 | 15.3 | Slight odour |
| PP | Example 3 | 87.7 | 16.1 | No odour |
| PP | Example 4 | 88.2 | 16.4 | No odour |
| PP | Example 5 | 88.2 | 16.2 | No odour |
| PP | Example 6 | 89.6 | 14.8 | Slight odour |
| PP | Example 7 | 90.3 | 15.1 | Slight odour |
| PP | Example 8 | 88.5 | 15.7 | No odour |
| PP | Example 9 | 88.5 | 15.9 | No odour |
| PP | Example 10 | 88.4 | 15.6 | No odour |
| PP | Comparative example 1 | 86.0 | 17.3 | Heavy odour |
| PP | Comparative example 2 | 86.3 | 17.7 | Heavy odour |
| PP | Blank nucleator | 80.8 | 48.6 | No odour |

According to the test results shown in table 1, the nucleator compositions according to examples 1-10 of the present invention can be used to improve transparency of polymer products. The polymer products will not give off unpleasant odour when the weight content of sorbitol triaceta is 2-5%.

For PE, when the weight content of sorbitol triacetal in the total weight of sorbitol diacetal and sorbitol triacetal is 2-5%, the PE products have desirable transparency.

Experiment Example 2

According to the test results in experimental example 1, the nucleator composition of the present invention can be used in polymers. When the content of aldehyde is less than 0.015%, the polymer products will not give off unpleasant odour, as will be explained below in view of effect examples as following.

Tests were carried out on market available products, CDBS and MDBS (purchased from Chinese company) containing more than 2% aromatic aldehydes respectively and no sorbitol triacetal. 35 kg $H_2O_2$ (concentration of $H_2O_2$ is about 30%) was added and stirred for 4 hours. Washing and centrifugal dewatering were repeated two times. After drying and smashing, treated market available products were obtained. Treated market available products are processed and tested in the same condition as that in experimental example 1. The tests are carried out to four treated market available products which do not contain sorbitol triacetal. Treated market available product 1 is CDBS. Treated market available product 2 is MDBS. The test results are shown as following:

TABLE 2

Effects of treated market available nucleator on the performances of injection molded samples (weight content of nucleator in the polymer is 0.2 wt %)

| Polymer | nucleator | Content of aromatic aldehydes | Odour intensity |
|---|---|---|---|
| PE | Treated market available product 1 | 0.005% | Odour |
| PE | Treated market available product 2 | 0.013% | Odour |
| PP | Treated market available product 1 | 0.005% | Odour |
| PP | Treated market available product 2 | 0.013% | Odour |

According to the test results shown in table 2, although the content of aromatic aldehydes in treated market available product is less than 0.015%, it still give off odour, which indicates sorbitol triacetal in the products of the present invention can ensure the products will not give off odour even though the products contain less than 0.015% aromatic aldehydes. In addition, the products of the present invention have desirable performances.

The invention claimed is:
1. A nucleator composition, comprising: a compound represented by formula (I),

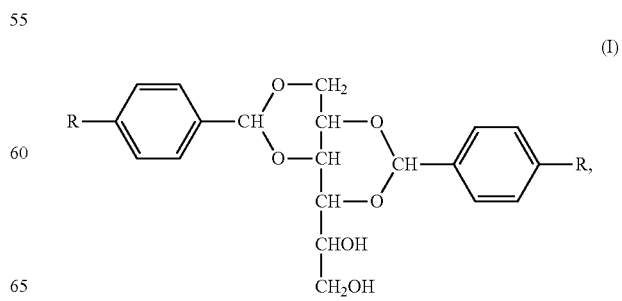

a compound represented by formula (II)

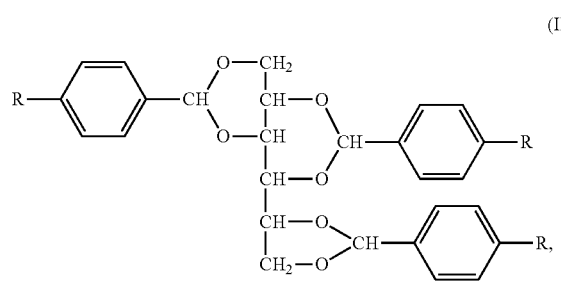

and a compound represented by formula (III)

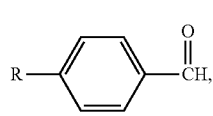

wherein each R is —Cl, —Br, —CH$_3$ or —CH$_2$—CH$_3$ independently, a weight ratio of the compound represented by formula (I) to the compound represented by formula (II) is 95.0-98.0:2.0-5.0, and a weight content of the compound represented by formula (III) in the nucleator composition is 0.0001-0.015 wt %.

2. The nucleator composition of claim 1, wherein a weight content of the compound represented by formula (II) in the nucleator composition is 2.0-5.0 wt %.

3. The nucleator composition of claim 1, wherein a weight content of the compound represented by formula (III) in the nucleator composition is 0.001-0.010 wt %.

4. The nucleator composition of claim 1, wherein R is —Cl.

5. The nucleator composition of claim 1, wherein R is —CH$_3$.

6. A polymer containing the nucleator composition of claim 1, wherein a weight content of the nucleator composition in the polymer is 0.1-0.3 wt %.

7. The polymer of claim 6, wherein the polymer is polyethylene or polypropylene.

8. Use of the nucleator composition of claim 1 in a polymer, comprising: adding the nucleator composition into polymer and mixing to obtain a mixture; and squeezing the mixture by a twin screw extruder at an extrusion temperature of 180~210° C., wherein the polymer is polyethylene or polypropylene.

9. Use of a compound represented by formula (II) in reducing or eliminating odour of a polymer containing a nucleator composition, comprising: adding the nucleator composition into the polymer and mixing to obtain a mixture; and squeezing the mixture by a twin screw extruder at an extrusion temperature of 180~210° C.,

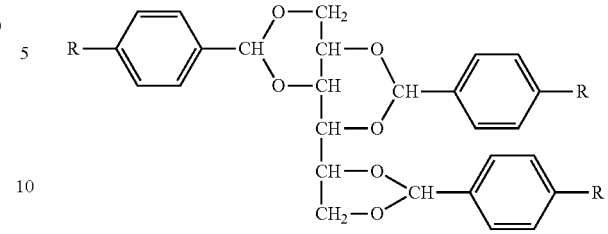

wherein the nucleator composition comprises compounds represented by formula (I), formula (II) and formula (III),

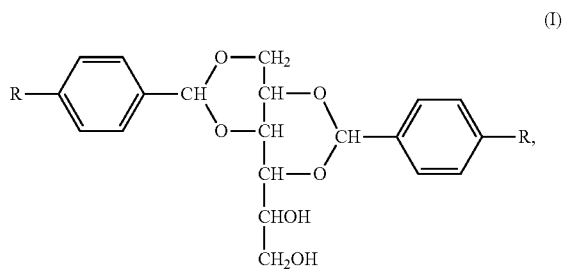

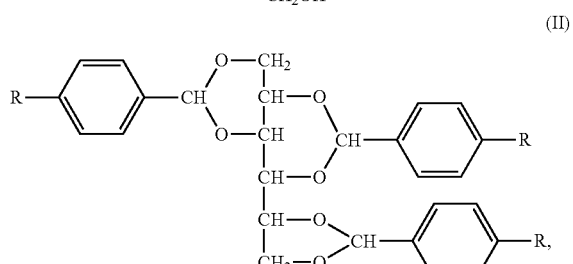

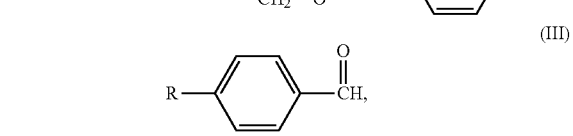
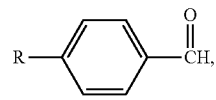

wherein each R is —Cl, —Br, —CH$_3$ or —CH$_2$—CH$_3$ independently, a weight ratio of the compound represented by formula (I) to the compound represented by formula (II) is 95.0-98.0:2.0-5.0, and a weight content of the compound represented by formula (III) in the nucleator composition is 0.0001-0.015 wt %.

10. Use of claim 9, wherein a weight content of the compound represented by formula (II) in the nucleator composition is 2.0-5.0 wt %.

11. Use of claim 9, wherein a weight content of the compound represented by formula (III) in the nucleator composition is 0.001-0.010 wt %.

12. A plastic article, wherein the plastic article is made from the polymer of claim 6.

* * * * *